(12) United States Patent
Gerhardt et al.

(10) Patent No.: US 7,616,606 B2
(45) Date of Patent: *Nov. 10, 2009

(54) MECHANISM FOR AVOIDING TRIGGERING SILENT RADIO SQUELCH CIRCUITS

(75) Inventors: Edward Carl Gerhardt, Malabar, FL (US); Paul G. Greenis, Melbourne, FL (US); William R. Highsmith, Indialantic, FL (US)

(73) Assignee: Adapt4, LLC, Melbourne, FL (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/532,338

(22) Filed: Sep. 15, 2006

(65) Prior Publication Data

US 2007/0008875 A1  Jan. 11, 2007

Related U.S. Application Data

(63) Continuation-in-part of application No. 10/730,753, filed on Dec. 8, 2003, now Pat. No. 7,457,295.

(60) Provisional application No. 60/784,105, filed on Mar. 20, 2006, provisional application No. 60/432,223, filed on Dec. 10, 2002.

(51) Int. Cl.
*H04W 4/00* (2006.01)

(52) U.S. Cl. ............... 370/329; 370/322; 370/342; 370/343; 370/395.41; 370/395.42; 370/437; 370/468; 370/445; 370/433; 370/447; 370/450; 370/454; 370/459; 370/461; 455/450; 455/451; 455/452.1; 455/452.2; 455/62; 455/503; 455/506; 455/500; 455/513; 455/456.4; 455/456.5; 455/7; 455/10; 375/135; 375/136; 375/346; 375/350; 375/132; 375/140; 375/326; 375/334

(58) Field of Classification Search ....................... None
See application file for complete search history.

(56) References Cited

U.S. PATENT DOCUMENTS

| | | | |
|---|---|---|---|
| 4,578,815 A | 3/1986 | Persinotti | 455/15 |
| 5,040,238 A | 8/1991 | Comroe et al. | 455/33 |
| 5,475,677 A | 12/1995 | Arnold et al. | 370/29 |
| 5,475,866 A | 12/1995 | Ruthenberg | 455/33.1 |
| 5,901,357 A | 5/1999 | D'Avello et al. | 455/454 |
| 5,999,818 A | 12/1999 | Gilbert et al. | 455/448 |
| 6,034,988 A * | 3/2000 | VanderMey et al. | 375/134 |
| 6,169,761 B1 * | 1/2001 | Marcoccia et al. | 375/132 |
| 6,301,481 B1 | 10/2001 | Para | 455/450 |
| 6,304,756 B1 * | 10/2001 | Hebeler et al. | 455/450 |

(Continued)

OTHER PUBLICATIONS

Cherubini, Giovanni, *Filtered Multitone Modulation for Very High-Speed Digital Subscriber Lines*, IEEE, vol. 20, No. 5, Jun. 2002, pp. 1016-1028.

(Continued)

*Primary Examiner*—Raj Jain
(74) *Attorney, Agent, or Firm*—Feldman Gale, P.A.; Michael C. Cesarano

(57) ABSTRACT

A 'smart' sub-channel hopping control mechanism executes one or more sub-channel selection discriminators to enable the communications controller of a spectral reuse transceiver to delineate on which of a plurality sub-channels the spectral reuse transceiver may transmit, so as to substantially reduce the likelihood of triggering squelch circuits of silent radios of primary (licensed) channel users.

8 Claims, 4 Drawing Sheets

U.S. PATENT DOCUMENTS

| | | | | |
|---|---|---|---|---|
| 6,324,184 | B1 | 11/2001 | Hou et al. | 370/468 |
| 2002/0002052 | A1 | 1/2002 | McHenry | 455/447 |
| 2002/0085503 | A1 | 7/2002 | Hulyalkar et al. | 370/252 |
| 2003/0050012 | A1 | 3/2003 | Black et al. | 455/62 |
| 2003/0058924 | A1* | 3/2003 | Darby et al. | 375/135 |
| 2003/0181213 | A1 | 9/2003 | Sugar et al. | 455/454 |
| 2004/0047324 | A1 | 3/2004 | Diener | 370/338 |
| 2004/0077366 | A1 | 4/2004 | Panasik et al. | 455/514 |
| 2004/0097190 | A1* | 5/2004 | Durrant et al. | 455/7 |

OTHER PUBLICATIONS

Moonen, Marc, *Per Tone Equalization for DMT Receivers*, Globecom, Rio de Janeiro, Brazil, Dec. 1999, 6 pages.

Zhou, Shengli, *Finite-Alphabet Based Channel Estimation for OFDM and Related Multicarrier Systems*, IEEE, vol. 49, No. 8, Aug. 2001, pp. 1402-1414.

Lee, Donghoon, *A New Symbol Timing Recovery Algorithm for OFDM Systems*, IEEE, 1997, pp. 366-367.

van de Beek, Jan-Jaap, *ML Estimation of Time and Frequency Offset in OFDM Systems*, IEEE, vol. 45, No. 7, Jul. 1997, pp. 1800-1805.

Wyglinski, Alexander M., *Adaptive Filterbank Multicarrier Wireless Systems for Indoor Environments*, Proc. $56^{th}$ IEEE Vehicular Tech Conf. (Vancouver, BC), Sep. 2002, pp. 336-340.

Saulnier, Gary J., *Performance Of An OFDM Spread Spectrum Communications System Using Lapped Transforms*, IEEE, 1997, 5 pages.

Ohm, Michael, *Extended Lapped Transforms for Digital Multicarrier Modulation*, Globecom, IEEE 25-29, Nov. 2001, pp. 217-221.

Saulnier, Gary J. *Performance of a Spread Spectrum OFDM System in a Dispersive Fading Channel with Interference*, IEEE, 1998, 5 pages.

Eneman, Koen, *Para-Unitary Filter Bank Design for Oversampled Subband Systems*, Dec. 1997, rev. Jul. 1998, 31 pages.

Govardhanagiri, Subbarao, *Performance Analysis of Multicarrier Modulation Systems Using Cosine Modulated Filter Banks*, IEEE, 1999, pp. 1405-1408.

Schuller, Gerald, *Modulated Filter Bank with Arbitrary System Delay: Efficient Implementations and the Time-Varying Case*, IEEE, vol. 48, No. 3, Mar. 2000, pp. 737-748.

Karp, Tanja, *Modified DFT Filter Banks with Perfect Reconstruction*, IEEE, vol. 46, No. 11, Nov. 1999, pp. 1404-1414.

Heller, Peter, *A General Formulation of Modulated Filter Banks*, IEEE, vol. 47, No. 4, Apr. 1999, pp. 986-1002.

Harteneck, Moritz, *Design of Near Perfect Reconstruction Oversampled Filter Banks for Subband Adaptive Filters*, IEEE, vol. 46, No. 8, Aug. 1999, pp. 1081-1085.

Dick, Chris, *FPGA Interpolators Using Polynomial Filters*, $8^{th}$ International Conference, Sep. 13-16, 1998, 5 pages.

Barbarossa, Sergio, *Channel-Independent Synchronization of Orthogonal Frequency Division Multiple Access Systems*, IEEE, vol. 20, No. 2, Feb. 2002, pp. 474-486.

Müller, Stefan, *Comparison of Preamble Structures for Burst Frequency Synchronization*, Globecom, San Francisco, CA, Nov. 2000, pp. 1488-1493.

DesBrisay, Greg, *Basics of Orthogonal Frequency Division Multiplexing (OFDM)*, Cisco Systems, Inc., 2000, pp. 1-42.

Zhou, Shengli, *Digital Multi-Carrier Spread Spectrum Versus Direct Sequence Spread Spectrum for Resistance to Jamming and Multipath*, IEEE, vol. 50, No. 4, Apr. 2002, pp. 643-655.

Classen, Ferdinand, *Frequency Synchronization Algorithms for OFDM Systems Suitable for Communication Over Frequency Selective Fading Channels*, IEEE, 1994, pp. 1655-1659.

Keller, Thomas, *Orthogonal Frequency Division Multiplex Synchronization Techniques for Frequency-Selective Fading Channels*, IEEE, vol. 19, No. 6, Jun. 2001, pp. 999-1008.

Gardner, Floyd, *A BPSK/QPSK Timing-Error Detector for Sampled Receivers*, IEEE, vol. COM-34, No. 5, May 1986, pp. 423-429.

van de Beek, Jan-Jaap, *Low Complex Frame Synchronization in OFDM Systems*, IEEE 1995, pp. 982-986.

Pfletschinger, Stephen, *Optimized Impulses for Multicarrier Offset-QAM*, Globecom, IEEE 25-29, Nov. 2001, vol. 1, p. 207-211.

Landström, Daniel, *Time and Frequency Offset in OFDM Systems Employing Pulse Shaping*, IEEE, 1997, pp. 278-283.

Vahlin, Anders, *Optimal Finite Duration Pulses for OFDM*, IEEE, vol. 44, No. 1, Jan. 1996, pp. 10-14.

van de Beek, Jan-Jaap, *Synchronization of a TDMA-OFDM Frequency Hopping System*, IEEE 1998, 6 pages.

Zyren, Jim, *Tutorial on Basic Link Budget Analysis*, Intersil, Jun. 1998, pp. 1-8.

Gardner, Floyd M. *Interpolation in Digital Modems—Part I: Fundamentals*, IEEE, vol. 41, No. 3, Mar. 1993, pp. 501-507.

Erup, Lars, *Interpolation in Digital Modems—Part II: Implementation and Performance*, IEEE, vol. 41, No. 6, Jun. 1993, pp. 998-1008.

Li, Jian, *Carrier Frequency Offset Estimation for OFDM-Based WLANs*, IEEE, vol. 8, No. 3, Mar. 2001, pp. 80-82.

Larsson, Erik G., *Joint Symbol Timing and Channel Estimation for OFDM Based WLANs*, IEEE, vol. 5, No. 8, Aug. 2001, pp. 325-327.

Miaoudakis, Andreas, *An All-Digital Feed-Forward CFO Cancellation Scheme for Hiperlan/2 in Multipath Environment*, IEEE 2002, 5 pages.

Müller, Stefan H., *Comparison of Preamble Structures for Burst Frequency Synchronization*, Globcom, San Francisco, CA, Nov. 2000, pp. 1488-1493.

Ma, Xiaoli, *Non-Data-Aided Frequency-Offset and Channel Estimation in OFDM and Related Block Transmissions*, IEEE 2001, pp. 1866-1870.

Pompili, Massimiliano, *Channel-Independent Non-Data Aided Synchronization of Generalized Multiuser OFDM*, IEEE 2001, pp. 2341-2344.

Kim, Yun Hee, *An Efficient Frequency Offset Estimator for OFDM Systems and Its Performance Characteristics*, IEEE, vol. 50, No. 5, Sep. 2001, pp. 1307-1312.

van de Beek, Jan-Jaap, *A Time and Frequency Synchronization Scheme for Multiuser OFDM*, IEEE, vol. 17, No. 11, Nov. 1999, pp. 1900-1914.

Tufvesson, Fredrik, *Time and Frequency Synchronization for OFDM using PN-Sequence Preambles*, IEEE Vehicular Technology Conference, Amsterdam, The Netherlands, Sep. 1999, pp. 1-5.

Tufvesson, Fredrik, *Time and Frequency Synchronization for BRAN using PN-Sequence Preambles*, Radio Science and Communication, Karlskrona, Sweden, Jun. 14-17, 1999, pp. 1-5.

Vangelista, Lorenzo, Efficient Implementations and Alternative Architectures for OFDM-OQAM Systems, IEEE members, Communications, IEEE Transactions on vol. 49, Issue 4 pp. 664-675, Apr. 2001.

Dick, Chris, Implementation of FPGA Signal Processing Datapaths for Software Defined Radios, Communications Design China, Conference Proceedings, pp. 241-247 Aug. 2001.

Andraka, Ray, A Survey of CORDIC Algorithms for FPGA Based Computers, Andrake Consulting Group, International Symposium on Field Programmable Gate Arrays, Proceedings of the 1998 ACM/SIGDA Sixth International Symposium on Field Programmable Gate Arrays, pp. 191-200, 1998.

Vaidyanathan, P.P., Filter Banks in Digital Communications, Dept. of Electrical Engineering, California Institute of Technology, Pasadena, CA, Circuits and Systems Magazine, IEEE, vol. 1, Issue 2 pp. 4-25 Second Quarter 2001.

Weiss, Stephan, Fast Implementation of Oversampled Modulated Filter Banks, Dept. of Electronics, University of Southampton, Electronics Letters, vol. 36, Issue 17, pp. 1502-1503, Aug. 17, 2000.

Weiss, Stephan, Analysis and Fast Implementation of Oversampled Modulated Filter Banks, Dept. of Electronics, University of Southampton, Collection of papers from the IMA conference on Mathematics in Signal Processing, University of Warwick, Doc 2000, Book published by Oxford University Press, 2002 pp. 263-286.

Filtered Multitone Modulation for Very High Speed Digital Subscriber Lines, IBM Europe, IEEE Journal on selected areas in communications, vol. 20, No. 5, Jun. 2002.

Treichler, J.R., Practical Implementations of Blind Demodulators, Applied Signal Technology, Inc., Signals, Systems, and computers, 1997, conference record of the thirty first asilomar conference, Nov. 2-5, 1997, vol. 2, pp. 1028-1032.

Knapp, Steven, Using Programmable Logic to Accelerate DSP Functions, Xilinx, Inc., 1996.

Andraka, Ray, High performance digital down-converters for FPGAs, Xilinx Xcell Journal, Issue #38, fourth quarter 2000 pp. 48-51.

Doan, Vo, Nguyen, Optimal Interpolators for flexible digital receivers, McGraw University, Vehicular Technology conference, 2003, VTC 2003-Spring 574 IEEE Semi-annual, Apr. 22-25, 2003, vol. 4, pp. 2556-2559.

Speth, Michael, Frame synchronization of OFDM Systems in frequency selective fading channels, IEEE Vehicular Technology conference, 1997, IEEE, vol. 3, May 4-7, 1997, pp. 1807-1811.

Lambrette, Uwe, Techniques for Frame Synchronization on Unknown frequency selective channels, IEEE Vehicular technology conference, 1997, IEEE, May 4-7, 1997, vol. 2 pp. 1059-1063.

Johansson, Stefan, Silicon Realization of an OFDM Synchronization Algorithm, Department of Applied Electronics, Sweden, Electronics, circuits, and systems, 1999, proceedings of ICELS 99 the 6$^{th}$ IEEE International conference, vol. 1, Sep. 1999, pp. 319-322.

Schafhuber, Dieter, Pulse-shaping OFDM/BFDM Systems for time-varying channels: ISI/ICI Analysis, Optimal Pulse Design, and Efficient Implementation, Vienna University of Technology, in proceedings, IEEE PIMRC-2002 Lisbon (Portugal) Sep. 2002 pp. 1012-1016.

Langfeld, Patrick, OFDM system synchronization for powerline communications, University of Karlsruhe, International symposium on powerline communications and its applications (ISPLC), ISPLC proceedings, ISPLC 2000, document 16, pp. 15-22.

Gallardo, Ana, A preamble based carrier frequency estimation approach for B-FWA OFDM systems, advanced modulation and coding area, development programmes department, Greece, Intracom SA, 2002, Session M1, p. 5.

Litwin, Louis, The priniciples of OFDM, RF signal processing, RF Design Jan. 2001, pp. 30-48.

* cited by examiner

MECHANISM FOR AVOIDING TRIGGERING SILENT RADIO SQUELCH CIRCUITS

CROSS-REFERENCE TO RELATED APPLICATIONS

The present application is a continuation-in-part of and claims the benefit of previously filed, U.S. patent application Ser. No. 10/730,753, filed Dec. 8, 2003 now U.S. Pat. No. 7,457,295, by Brent Saunders et al, entitled: "Radio Communication System Employing Spectral Reuse Transceivers" (hereinafter referred to as the '753 application), which claims the benefit of U.S. Provisional Patent Application Ser. No. 60/432,223, filed Dec. 10, 2002, by Gerhardt et al entitled: "Link Utilization Mechanism for Secondary Use of A Radio Band"; and further claims the benefit of previously filed, U.S. Provisional Application Ser. No. 60/784,105, filed Mar. 20, 2006, by E. Gerhardt et al, entitled: "Link Utilization Mechanism for Aggregation of Disjoint Radio Bandwidth," the disclosures of each application being incorporated herein.

FIELD OF THE INVENTION

The present invention relates in general to communication systems and subsystems thereof, and is particularly directed to a 'smart' sub-channel hopping control mechanism that may be employed by the communications controller of a spectral reuse transceiver of a communication system of the type disclosed in the above-identified '753 application, to delineate on which ones of a plurality sub-channels (that are potentially available for reuse by a secondary user due to primary channel inactivity) the spectral reuse transceiver may transmit, in a manner that substantially reduces, and optimally minimizes, the likelihood of triggering the squelch circuits of 'silent' radios of users that have been licensed to transmit on currently inactive primary channels.

BACKGROUND OF THE INVENTION

As described in the above-identified '753 application, in some radio bands, such as the 217-220 MHz VHF band, as a non-limiting example, governmental licensing agencies (e.g., the Federal Communications Commission (FCC)) customarily grant primary licensees non-exclusive use of the band for a variety of communication services, such as push-to-talk voice transmission. These primary users pay for this licensed use with an expectation that they will not encounter interference by other users. The FCC also allows secondary users to access the same band and the same channels within the band on a 'non-interfering' or secondary basis, whereby a channel may be used by a secondary, non-licensed, user, so long as the primary user is not using that channel.

The FCC and similar agencies in foreign countries are continually looking for ways that allow expanded use of these licensed radio frequency bands, without reducing the quality of service available to the primary users. For secondary users, these bands provide a cost-free opportunity with excellent radio transmission properties for telemetry and other applications. Because secondary users must not interfere with primary users, complaints of interference from a primary user to the FCC may result in its issuing an administrative order requiring that the secondary user move to another portion of the band or leave the band entirely. Such a spectral transition is disruptive to the secondary user's service and can be expensive, especially if the site visits, equipment modification, or exchange are required, in order to implement the mandated change. It will be appreciate, therefore, that there has been a need for a mechanism that allows a secondary-user to employ a licensed band on a non-interfering basis and will adapt the radio's frequency usage should new primary users appear. It should be noted that primary users always have priority over secondary users, and that there is no first-use channel frequency right for secondary users.

Advantageously, the invention described in the above-referenced '753 application successfully addresses this need by means of a monitored spectral activity-based link utilization control mechanism. Briefly reviewing this link utilization control mechanism, which is intended for use with a star-configured communication system, such as that depicted in the reduced complexity diagram of FIG. 1, a spectral reuse transceiver installed at a master site 10 communicates with respective spectral reuse transceivers installed at a plurality of remote sites 12. Each spectral reuse transceiver operates with a selectively filtered form of frequency hopping for producing a sub-set of non-interfering radio channels or sub-channels.

For this purpose, the master site 10 periodically initiates a clear channel assessment routine, in which the master site and each of the remote sites 12 participate, in order to compile or 'harvest' a list of non-interfering or 'clear' sub-channels (such as 6.25 KHz wide sub-channels), which may be used by participants of the network for conducting communication sessions that do not ostensibly interfere with any licensed user. By transmitting on only sub-channels that have been determined to lie within clear channels, a respective site's spectral reuse transceiver is ensured that it will not interfere with any primary user of the band of interest.

Except when it is transmitting a message to the master site, each remote user site sequentially steps through and monitors a current list of clear channels (that it has previously obtained from the master site), in accordance with a pseudo-random (PN) hopping sequence that is known a priori by all the users of the network, looking for a message that may be transmitted to it by the master site transceiver. During the preamble period of any message transmitted by the master site, each remote site's transceiver scans all frequency bins within a given spectrum for the presence of energy. Any bin containing energy above a prescribed threshold is marked as a non-clear channel, while the remaining channels are identified as clear (and therefore available for reuse) channels.

Whenever a remote site notices a change in its clear channel assessment, it reports this to the master site at the first opportunity. As the master site has received clear channel lists from all the remote sites, it logically combines all of the clear channel lists, to produce a composite clear channel list. This composite clear channel list is stored in the master site's transceiver and is broadcast to all of the remote sites over a prescribed one of the clear channels that is selected in accordance with a PN sequence through which clear channels are selectively used among the users of the network. When the composite clear channel list is received at a respective remote site it is stored in its transceiver.

To ensure that all communications among the users of the network are properly synchronized (in terms of the (composite) clear channel list and the order through which the units traverse, or 'hop' through, the clear channel entries of the clear channel list), the master site's transceiver transmits an initialization message on an a priori established clear channel, which each of the remote units monitors. This initialization message contains the clear channel list, an identification of the preamble channel, a PN sequence tap list, and a PN seed that defines the initial channel and hopping sequence for the duration of an upcoming transmit burst. Once a remote site has received an initialization message, that site will transition to normal multiple access mode.

For further details of the architecture and operation of the spectral reuse link control mechanism disclosed in the above-referenced '753 application, attention may be directed to that document. They will not be detailed here, in order to focus the present description on the problem of 'silent' receiver interference, whereby transmissions on 'clear' and thereby potentially available secondary reuse sub-channels undesirably cause the activation of squelch circuits of primary users' silent receivers, namely, those primary user receivers that are not currently transmitting, but are monitoring primary users' channels, containing such 'clear' sub-channels, for a transmission (from another primary user).

SUMMARY OF THE INVENTION

In accordance with the present invention, this 'silent' receiver interference problem is successfully addressed by equipping the spectral reuse transceiver's communications controller with a 'smart' sub-channel hopping control mechanism, that uses one or more prescribed sub-channel selection filters or discriminators, to control the manner in which it hops among 'clear' or potentially available sub-channels, so as to substantially reduce and optimally minimize the likelihood that silent receivers of primary users will integrate sufficient energy in the sub-channel transmissions that would otherwise cause activation of their squelch circuits.

A first of these discriminators involves limiting the 'dwell time', or duration of transmission spent, on a hopped sub-channel, so as to reduce the energy density in a primary user channel (such as a 12.5 KHz push-to-talk voice channel) containing that sub-channel to a value that avoids activating of the squelch circuit of a radio tuned to that primary user channel.

A second discriminator involves rejecting, or not hopping to, the most recently (immediately previously) transmitted sub-channel, while a third discriminator involves rejecting an immediately 'spectrally adjacent' hopped sub-channel, namely, one that is spectrally mutually contiguous with (one hopped sub-channel higher or one hopped sub-channel lower than) the previously transmitted sub-channel.

Similar to the effect of the first discriminator, not hopping to a "most recently transmitted" sub-channel, or to a "spectrally adjacent" sub-channel, prevents the squelch circuit of a primary user's silent receiver (that is tuned to the channel containing such a sub-channel) from otherwise integrating energy in that sub-channel which, when combined with the energy in the previous, or spectrally adjacent, sub-channel, might be sufficient to trigger the receiver's squelch circuit.

A fourth discriminator involves rejecting, or not hopping to, a sub-channel that is spectrally located at the 'center' of a primary user channel. By 'center' of a primary user channel is meant a sub-channel whose center frequency coincides with that of the primary user channel, or a sub-channel that coincides with one of those sub-channels, into which the primary channel may be sub-divided, which overlap or are immediately adjacent to the center frequency of the primary channel. The fourth discriminator avoids these sub-channels, hopping instead to only those sub-channels that are spectrally adjacent to 'edges' of the primary channel. This selective use of only edge-adjacent sub-channels again serves to minimize the energy density seen by the squelch circuit in the vicinity of the center frequency of the primary channel, and thereby reduces the likelihood that the squelch circuit will be triggered by the energy in the sub-channel transmission.

DETAILED DESCRIPTION

Figure 1:
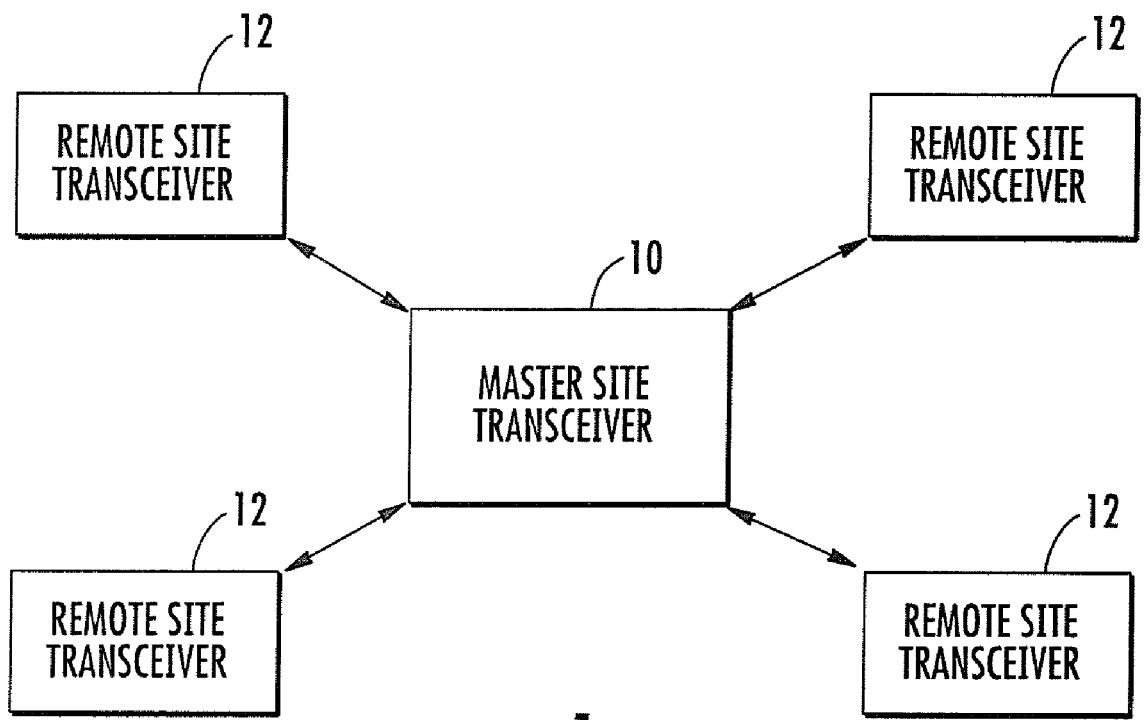
FIG. 1 diagrammatically illustrates the overall architecture of a communication network, respective terminal unit transceiver sites of which employ the spectral reuse transceiver of the invention disclosed in the above-referenced '753 application.

Before describing the details of the 'smart' sub-channel hopping control mechanism of the present invention, it should be observed that the invention essentially involves an augmentation of the sub-channel hopping control mechanism executed by the communications control processor of the spectral reuse transceiver of the type disclosed in the above-referenced '753 application, that involves the execution of one or more prescribed discriminators or sub-channel selection filters, so as to effectively minimize the likelihood that the silent receiver of a primary user will see sufficient sub-channel energy that would otherwise cause its activation of its squelch circuit. As will be described, these filter functions are readily implemented by appropriately setting the configuration parameters used by the communications controller of the transceiver disclosed in the '753 application to control the operation of the transceiver. The architecture of the transceiver of the '753 application remains unchanged. As a consequence, the present invention has been illustrated in the drawings by readily understandable diagrammatic illustrations, which include a generalized network architecture diagram, and a channel sub-division diagram, that show only those details that are pertinent to the invention, so as not to obscure the disclosure with details which will be readily apparent to one skilled in the art having the benefit of the description herein.

As pointed out briefly above, an essential objective of each of the discriminators of the augmentation to the sub-channel hopping control mechanism in accordance with the invention is to substantially reduce, or minimize, the likelihood that any sub-channel transmitted by the spectral reuse transceiver will present sufficient energy, in the channel to which a silent receiver of a primary user is tuned, to trigger the receiver's squelch circuit. Non-limiting, but preferred, examples of such discriminators include: 1—limiting the 'dwell time' (duration of transmission) on a hopped sub-channel; 2—rejecting (not hopping to) the most recently transmitted sub-channel; 3—rejecting an immediately 'spectrally adjacent' sub-channel; and 4—rejecting a sub-channel that is spectrally located at the 'center' of a primary user channel. The operation and effect of each of these discriminators will be discussed individually below.

Figure 2:
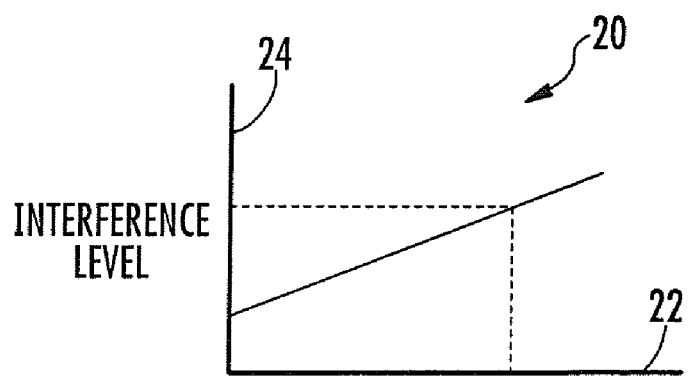
FIG. 2 graphically illustrates the relationship between silent receiver interference level and dwell time in a spectral reuse transceiver of the type described in the above-referenced '753 application.

To facilitate an understanding of the functionality and effect of the first discriminator—dwell time—attention may be directed to FIG. 2, which graphically illustrates the relationship between silent receiver interference level and dwell time in a spectral reuse transceiver of the type described in the above-referenced '753 application. As pointed out above, by 'dwell time' is meant the length of time that the transmission section of the spectral reuse transceiver remains on a selected sub-channel before hopping to a new sub-channel. Typically, dwell time is measured in numbers of symbols, bits, or milliseconds. In the graph 20 of FIG. 2, dwell time is a point along the horizontal axis 22, while interference is a point along the vertical axis 24. As can be seen from the graph, decreasing dwell time on a sub-channel serves to reduce the energy density in a primary user channel (such as a 12.5 KHz push-to-talk voice channel) containing that sub-channel to a value that avoids activating of the squelch circuit of a radio tuned to that primary user channel.

The graph 20 of FIG. 2 applies to frequency-hopping radios in general; the actual values of points on the graph will depend upon the particular implementation of the frequency-hopping dwell time control mechanism used by the radio. It should be noted that there is a trade-off between dwell time and each of complexity of implementation and sub-channel availability. Reducing the dwell time to an extremely short interval can be non-trivial, as it increases the complexity of the design. In addition, depending on the implementation of the dwell time control mechanism, there may be a reduction in throughput, as the dwell time decreases. Thus, the actual dwell time on a hopped sub-channel is a choice of the manufacturer, based upon intended performance, implementation complexity and regulatory constraints.

As a non-limiting, but practical, illustration, reducing the dwell time to a value on the order of five symbols (or less) provides a significant reduction in the likelihood that the sub-channel transmission will trigger silent receiver squelch noise. This is due to the fact that the principal effect of decreasing the dwell time or duration of transmission at a respective hopped sub-channel is a reduction in the energy density in a user channel (such as a 12.5 KHz voice radio user channel) to which a silent receiver of a primary user is tuned, and thereby reduces the likelihood that the constrained dwell time sub-channel transmission will trigger a receiver's squelch circuit.

A second discriminator or filter that may be used by the transceiver's communications controller to reduce or minimize the amount of sub-channel energy present in the bandwidth of the channel to which a silent receiver is tuned, is operative to cause the communications controller to reject, or not hop to, the most recently used, or immediately precedent, hopped sub-channel. A relatively simple filtering mechanism, shown in the flowchart of FIG. 3, described below, involves incrementally 'sweeping' the transmission frequency—for example, from the lowest sub-channel to the highest sub-channel (or conversely from the highest sub-channel to the lowest sub-channel), which ensures that no sub-channel will be used for two immediately successive hops.

A third discriminator involves rejecting an immediately 'spectrally adjacent' hopped sub-channel, namely, a sub-channel that is spectrally mutually contiguous with (one hopped sub-channel higher or one hopped sub-channel lower than) the previously transmitted sub-channel. Similar to the effect of the first discriminator, not hopping to a most recently transmitted sub-channel in accordance with the second discriminator, or not hopping to a spectrally adjacent sub-channel in accordance with the third discriminator prevents the squelch circuit of a primary user's silent receiver that is tuned to a channel containing such a sub-channel from otherwise integrating energy in that sub-channel which, when combined with the energy in the previous or spectrally adjacent sub-channel, might be sufficient to trigger the receiver's squelch circuit.

As in the case of the second discriminator, rejecting an immediately 'spectrally adjacent' hopped sub-channel may be readily accomplished by incrementally sweeping the transmission frequency and skipping every nth sub-channel, and repeating as necessary, using the next value of n. For example, with n having a value of two, the spectral reuse transceiver may use even-numbered sub-channels and then odd-numbered sub-channels, repeating as necessary. Depending on the implementation chosen, more-random selections may be used. The sub-channel selection distribution function (such as a uniform distribution or Gaussian distribution) may be further constrained by a density function that rejects selections which increase the energy density in any one or more user channels in the band. For example, the sub-channel rejection filter may prohibit 'n' transmissions per period 't',where 'n' and 't' are parameters of the filter. After such a rejection, the distribution function may be used again to find a new 'candidate' sub-channel.

Figure 3:
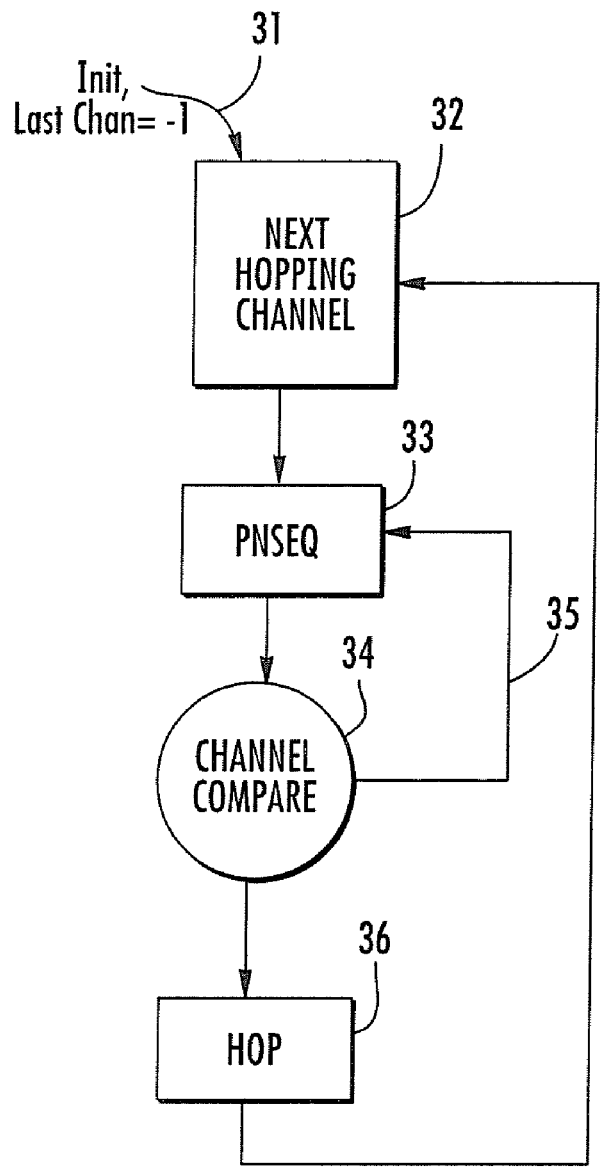
FIG. 3 is flowchart of a routine for implementing sub-channel discriminators that reject most recently used and spectrally adjacent sub-channels.

More particularly, as shown in FIG. 3, a filter routine that is effective to implement the second and third discriminator functions, described above, has an initialized entry point 31, wherein the designation of the last hopped sub-channel is set at an invalid value (e.g., −1), so that the first selected hopped sub-channel will always be valid (not filtered out). A next hopping channel step 32 then causes the next hopped sub-channel to be selected, by invoking the operation of a pseudo-random number sequence generator (PNSEQ) step 33. When invoked, PNSEQ step 33 outputs a pseudo-randomly based number that specifies one of the available hopped sub-channels as a 'candidate' hopped channel.

This candidate hopped sub-channel is then coupled to a channel compare step 34, which determines whether the candidate hopped sub-channel, as specified by the PNSEQ step 33, is the 'same' hopped sub-channel as, or is 'adjacent' to the last valid hopped sub-channel. If the candidate hopped channel is the 'same as', or 'adjacent' to, the last valid hopped channel, the channel compare step 34 provides an output 35 to the PNSEQ step 33 to select a new candidate hopped sub-channel. Otherwise, the channel compare step 34 supplies the candidate hopped sub-channel to a hop step 36, which outputs the candidate hopped sub-channel to the frequency hopping control mechanism of the transceiver, causing the transceiver to be tuned to that sub-channel. (It should be noted that although selection of the next candidate hopped sub-channel in the routine of FIG. 3 is pseudo-randomly based, as an equivalent alternative, it may be non-randomly based (e.g., an immediately successive hopped sub-channel, or every $n^{th}$ hopped sub-channel).)

As interfering traffic increases, the number of available sub-channels will decrease and, at some point, the distribution filter may be unable to find any candidate sub-channels that satisfy the discriminator function. In this case, the quality of service will be reduced, as a result of complying with an interference-avoidance policy, which is a filter configuration parameter, such as flow-controlling lower-priority radio traffic or flow-controlling all traffic in the network. If the policy permits, the frequency-hopping sequences may be repeated, in which case the transmission density may increase (with an associated increase in interference), but throughput will remain unchanged. The frequency-hopping sequences may be managed in the frequency and time domains to minimize energy density over time in the various user channels, thereby minimizing the likelihood of activating legacy squelch circuits.

A fourth, 'channel center-avoidance',discriminator involves rejecting (not hopping to) a sub-channel that is spectrally located at, or in the vicinity of, the 'center' of a primary user channel. Being 'centrally' located means that transmission of the sub-channel would inject energy into a spectrally center portion of the primary user channel, where the silent receiver is particularly sensitive. As an example, the center frequency of the sub-channel may coincide with that of the primary user channel, or may overlap or be immediately adjacent to the center frequency of the primary channel. The fourth discriminator avoids these sub-channels, by hopping, instead, to only those sub-channels that may be considered to be spectrally displaced from the center of the primary channel, so as to be close or adjacent to 'edges' of the primary channel. This selective use of only edge-adjacent sub-channels again serves to mitigate against the sub-channel injecting inject energy into the spectrally center portion of the primary user channel, so as to minimize the energy density seen by the squelch circuit in the vicinity of the center frequency of the primary channel, and thereby reduces the likelihood that the squelch circuit will be triggered by the energy in the sub-channel transmission.

In order to appropriately choose such 'edge'-associated sub-channels, the fourth discriminator relies upon the spectral structure of the band's channel plan. As a non-limiting illustration, consider the spectral structure of the licensed 217-220 MHz band referenced above, which, as illustrated in the reduced complexity spectral diagram of FIG. 4, contains a distribution of 6.25 KHz, 12.5 KHz, 25 KHz and 50 KHz user channels, respectively shown at 41, 42, 43 and 44. The spectral disparity among these channels results from the fact that, over time, they have been sequentially licensed to various primary users in response to incremental allocation requests, on the one hand, and due to the evolution of tighter spectral efficiency requirements that have been promulgated by the FCC to meet the continuously increasing demand for bandwidth.

Figure 4:
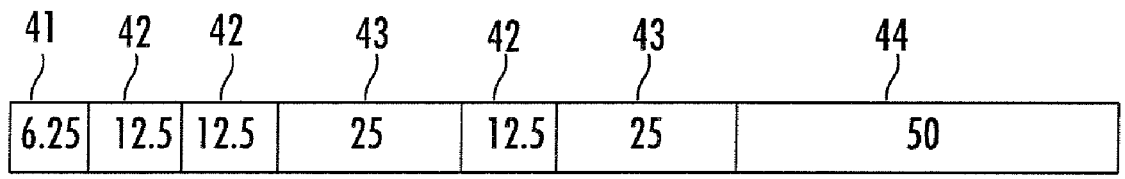
FIG. 4 is a reduced complexity spectral diagram showing a distribution of 6.25 KHz, 12.5 KHz, 25 KHz and 50 KHz primary user channels.

For the band structure example of FIG. 4, the filtering mechanism employed by the fourth discriminator selects hopping sub-channel sequences that give preference to those 6.25 KHz sub-channels that are located at or coincide with edges of the respective 12.5 KHz and 25 KHz primary user channels 42 and 43, or which are contained within either of two pairs of spectrally contiguous 6.25 KHz sub-channels, that spectrally abut the edges of a 50 KHz primary user channel 44. This may be readily understood by reference to the spectral diagrams of FIGS. 5, 6 and 7.

Figure 5:
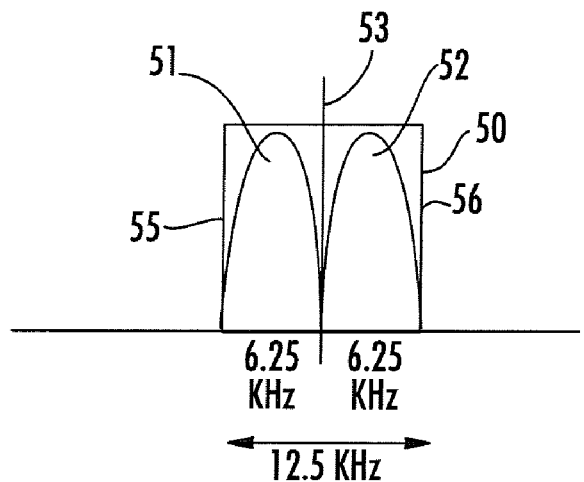
FIG. 5 is a spectral diagram showing two 6.25 KHz sub-channels spectrally abutting the edges of a 12.5 KHz primary user channel.

In particular, FIG. 5 shows two 6.25 KHz sub-channels 51 and 52 spectrally abutting the edges 55, 56, respectively of a 12.5 KHz primary user channel 50, so that the center frequencies of the 6.25 KHz sub-channels 51 and 52 are spectrally displaced from the center frequency of the 12.5 KHz primary user channel 50. Therefore, selecting either of sub-channels 51 and 52 will cause the spectral reuse transceiver to transmit on a sub-channel whose center frequency is spectrally spaced apart from the center frequency of the 12.5 KHz primary user channel 50; also, as shown in FIG. 5, the energy in either sub-channel 51/52 is minimal at the center frequency 53 of the 12.5 KHz channel 50.

Figure 6:
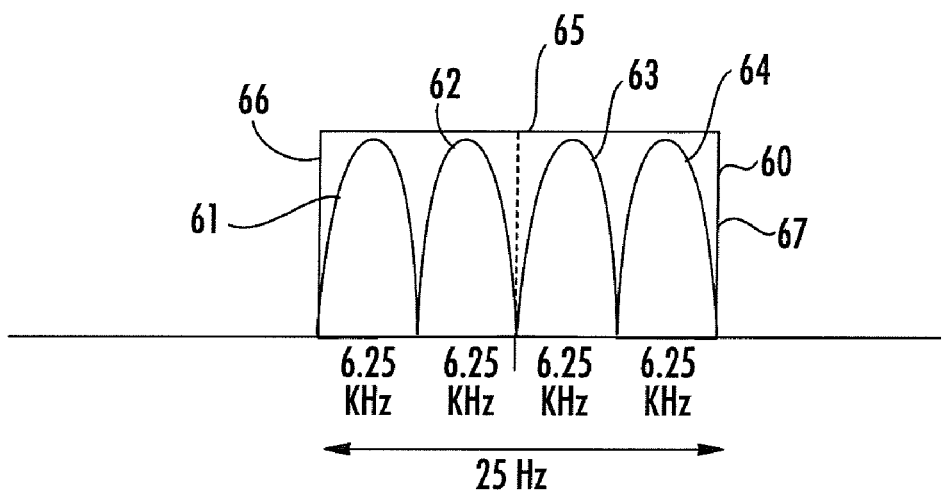
FIG. 6 is a spectral diagram showing the band structure of a 25 KHz primary user channel divided into four 6.25 KHz sub-channels.

FIG. 6 shows the band structure of a 25 KHz primary user channel 60, in which four 6.25 KHz sub-channels 61, 62, 63 and 64 are available. Of these four sub-channels, sub-channels 61 and 64 spectrally abut the outer edges 66 and 67, respectively, of the 25 KHz primary user channel 60, and may therefore be denoted as 'outer' sub-channels; on the other hand, while sub-channels 62 and 63 are spectrally adjacent to the center frequency 65 of the 25 KHz primary user channel 60, and may therefore be denoted as 'inner' sub-channels. As can be seen from FIG. 5, transmitting on only the edge-adjacent or 'outer' sub-channels 61 and 64 will inject less energy into the spectrally central portion of the 25 KHz user channel 60, and therefore will typically have less impact on a squelch circuit of a silent receiver tuned to the 25 KHz user channel than would transmitting on either of the 'inner' sub-channels 62 and 63 near the center frequency of the user channel 60. As a result, transmitting on either of the 'outer' sub-channels 61 and 64 will reduce the likelihood that the squelch circuit will be triggered by the energy in either of these two 'outer' sub-channels.

It may be noted that, for the case of using 12.5 KHz and 25 KHz primary user channels, shown in FIGS. 5 and 6, if more (6.25 KHz) sub-channels are required, gradual selections may be made, in order to uniformly distribute sub-channel selections across the primary user channels. Preference may be given to a second one of the two 'outer' 6.25 KHz sub-channels 61 and 64 within a 25 KHz user channel 60 in a given amount of time, versus using the second of the two 6.25 KHz sub-channels 51, 52 within a 12.5 KHz user channel 50. Also, the choice of sub-channels may be such that the spectral reuse transceiver will not make adjacent sub-channel hops within any 25 KHz voice channel, thereby minimizing the energy-integrating effect of legacy squelch circuits.

Figure 7:
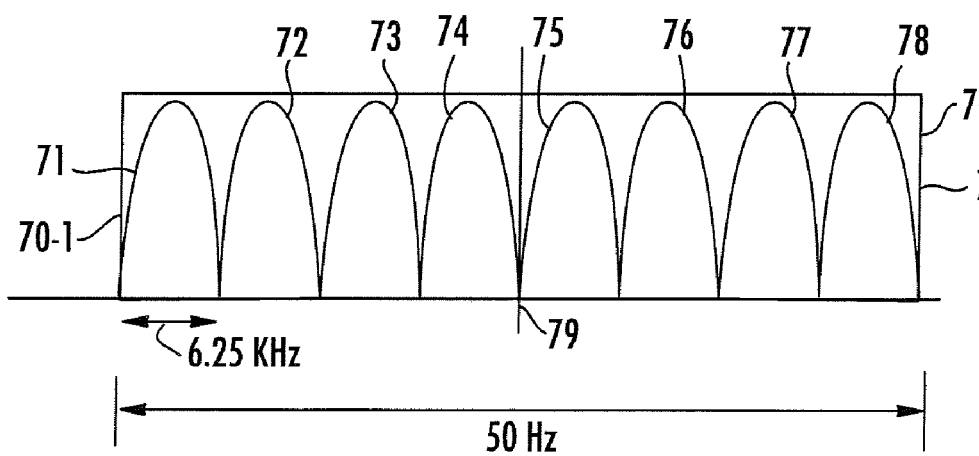
FIG. 7 is a spectral diagram showing the band structure of a 50 KHz primary user channel divided into eight 6.25 KHz sub-channels.

FIG. 7 shows the band structure of a 50 KHz primary user channel 70, in which eight 6.25 KHz sub-channels 71, 72, 73, 74, 75, 76, 77 and 78 are available. Of these eight sub-channels, two pairs of mutually contiguous sub-channels 71, 72 and 77, 78 spectrally abut the respective edges 70-1 and 70-2 of the 50 KHz primary user channel 70, and may therefore be denoted as 'outer' pairs of sub-channels, while two pairs of mutually contiguous sub-channels 73, 74, 75 and 76 are spectrally adjacent to the center frequency 79 of the 50 KHz primary user channel 70, and may therefore be denoted as 'inner' pairs of sub-channels. As can be seen from FIG. 7, transmitting on only the edge-adjacent pairs of sub-channels 71, 72 and 77, 78 will substantially reduce (optimally minimize) the energy density seen by a silent receiver that is tuned to (the center frequency of) the 50 KHz primary channel 70, and thereby reduce the likelihood that its squelch circuit will be triggered by the energy in any sub-channel of either of the two 'outer' pairs of sub-channels.

Figure 8:
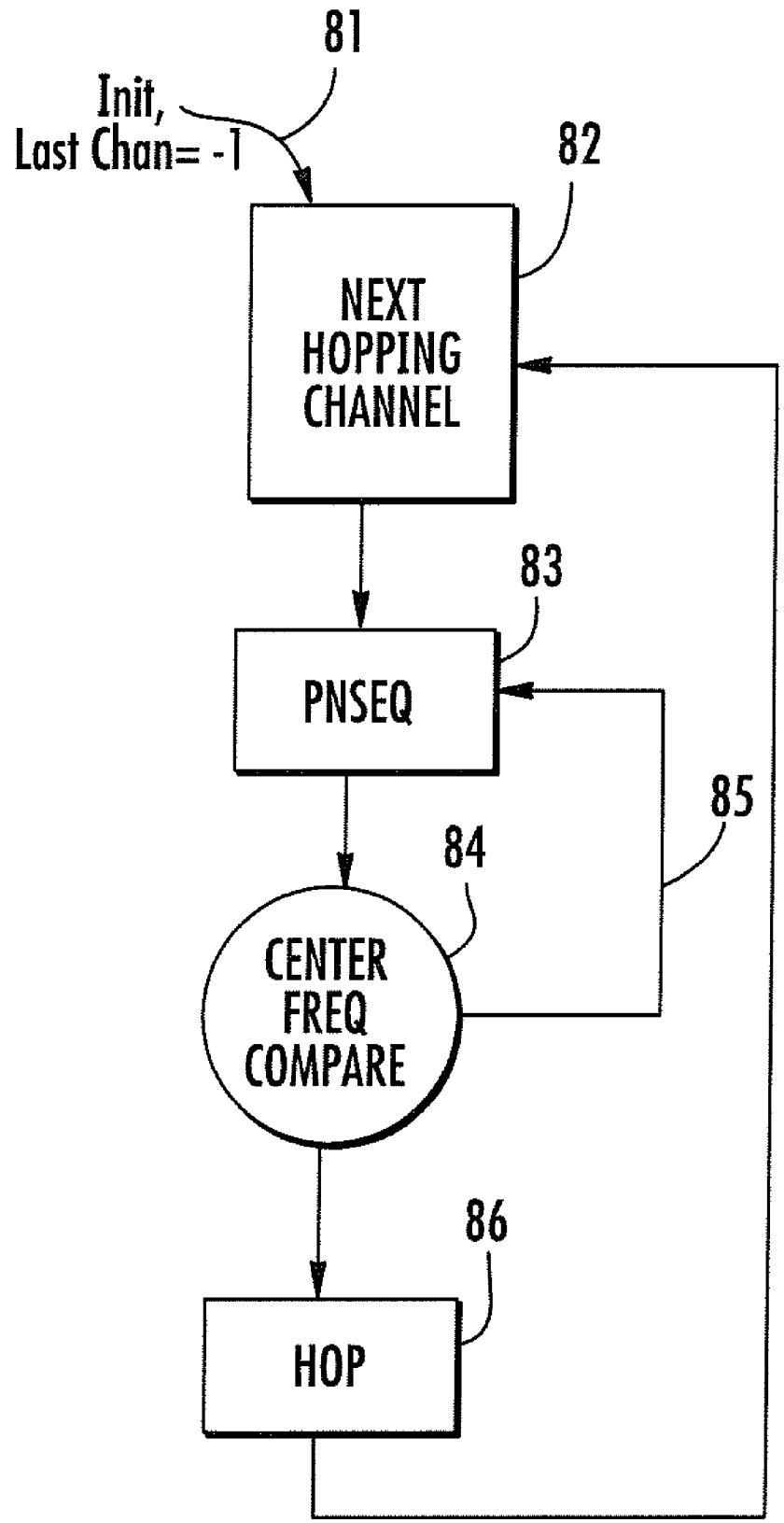
FIG. 8 shows the respective steps of a sub-channel selection routine that may be employed to implement a channel center-avoidance discriminator.

FIG. 8 shows the respective steps of a filter routine that may be employed to implement the 'channel center-avoidance' discriminator described above with reference to FIGS. 5-7. In particular, the routine of FIG. 8 serves to mitigate against silent receiver interference by avoiding transmitting on those (6.25 KHz) sub-channels that encroach upon the 'center' of an allocated user channel. As described above, the center of a primary user channel may overlap one or more candidate sub-channels, depending on the plan used for the radio band. Also, it is again to be noted that the term 'center' is not limited to a particular band location, and may encompass one or more sub-channels, such as three hopped sub-channels as the 'center'.

The filter routine of FIG. 8 has an initialized entry point 81, wherein the designation of the last hopped sub-channel used is defaulted to an invalid value (e.g., −1), so that the first selected hopped sub-channel will always be valid (not filtered out). A next hopping channel step 82 causes the next hopped sub-channel to be selected by invoking the operation of a pseudo-random number sequence generator (PNSEQ) step 83. When invoked, PNSEQ step 83 outputs a pseudo-randomly based number that specifies one of the available (6.25 KHz) hopped sub-channels as a 'candidate' hopped channel.

This candidate hopped sub-channel is then coupled to a center frequency compare step 84, which determines whether the PNSEQ step 83 has selected a next to-be-hopped-to sub-channel candidate that overlaps the center of the user's channel. If the candidate sub-channel overlaps the center of the user's channel, the center frequency compare step 84 provides an output 85 that causes the PNSEQ step 83 to select a new candidate to-be-hopped-to sub-channel. Otherwise, the center frequency compare step 84 presents the candidate sub-channel to a hop step 86, which outputs the candidate sub-channel to the frequency hopping control mechanism of the spectral reuse transceiver radio, causing its transmitter to be tuned to that sub-channel. Again, as in the filter routine of FIG. 3, selection of the next candidate sub-channel in the routine of FIG. 8 need not be pseudo-randomly based, but may be non-randomly based (e.g., an immediately successive hopped sub-channel, or every $n^{th}$ hopped sub-channel).

As described above, the communications control processor for a spectral reuse transceiver of a communication system of the type disclosed in the above-identified '753 application may employ one or more of the discriminators described above. The choice of which discriminators are to be used is up to the user. For optimal performance, employing all four discriminators will minimize the likelihood of triggering the squelch circuits of most, if not all, currently employed receivers. However, even if all of the above discriminators are employed, there is still the possibility that the squelch circuit of silent radios of some primary users may be triggered by a sub-channel transmission. This possibility is due to the fact that, over the years, such users have purchased their (push-to-talk) radios from different manufacturers, whose products vary in cost and do not necessarily adhere to a common set of quality and performance standards. As a result, the sensitivities of the squelch circuits of these radios are not the same.

For example, some squelch circuits do not have significant selectivity (or can be adjusted arbitrarily low), and will respond to true random noise, if the squelch threshold is very close to the noise floor. As the squelch circuit's threshold approaches the noise floor, it ceases to provide differentiation between a useful signal and noise. Also, while it is important to avoid successive (hopped) transmissions on spectrally adjacent sub-channels and successive transmissions on the same sub-channel within a given user channel, as described above with reference the second and third discriminators, it is also important to manage sub-channel transmissions with a greater granularity, which can be carried out in the time domain. Thus, using multiple discriminators should effectively prevent the energy in each sub-channel transmission from significantly accumulating in time in any user channel, thereby mitigating against an undesirable increase in sub-channel energy density seen by a silent receiver.

However, if the receiver of a primary user's (push-to-talk) radio has relatively low signal processing/filtering capability, its squelch circuit may be triggered by a secondary user's sub-channel transmission, even if all of the discriminators are used. Should this occur, it can be expected that the primary user will complain to the FCC. In this case, the practical recourse for the secondary user is to set the configuration parameters of the spectral reuse transceiver, so that the encroaching sub-channel is permanently excluded, or 'notched' out, from the clear channel assessment routine. This will prevent that routine from ever looking for activity in the offending sub-channel, and thereby effectively eliminate the possibility that such a permanently excluded sub-channel will activate the squelch circuit of the complaining user's silent radio.

As will be appreciated from the foregoing description, the likelihood of triggering the squelch circuit of silent receivers of licensed primary channel users as a result of transmitting of 'clear' sub-channels employed in a spectral reuse communication system of the type disclosed in the above-referenced '753 application is substantially reduced, and optimally minimized, in accordance with the present invention, by means of a 'smart' hopping control mechanism comprised of one or more or sub-channel selection prescribed discriminators or filters, that enables a transmitting spectral reuse transceiver to substantially reduce the amount of transmitted sub-channel energy that may be sensed by a silent receiver, as the spectral reuse transceiver sequentially hops to and transmits on potentially available sub-channels. Optimally, this serves to minimize the likelihood that silent receivers will integrate sufficient energy in sub-channel transmissions that would otherwise cause activation of their squelch circuits.

While we have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A method of conducting radio frequency (RF) communications on a communications network comprising at least a master site transceiver and one or more remote site transceivers to minimize triggering of squelch circuits on primary user channels by transmitting on selected sub-channels contained within said primary user channels of a prescribed RF communications band, said method comprising steps of:
   (a) identifying excluded primary user channels within said prescribed RF communications band;
   (b) monitoring by said one or more remote site transceivers, said prescribed RF communications band for the presence of communication activity on said sub-channels, and identifying those ones of said sub-channels which are effectively absent RF communication activity as clear sub-channels available for use in said communications network by said one or more remote site transceivers;
   (c) compiling a list of prescribed sub-channels at said master site transceiver as received from each of said one or more remote site transceivers, said list comprising sub-channels that meet the conditions (i) of not falling within said excluded primary user channels and (ii) of having been identified as clear sub-channels by said one or more remote site transceivers;
   (d) conducting RF communications between said at least a master site transceiver and said one or more remote site transceivers while minimizing RF energy on said identified primary user channels by controllably hopping among and transmitting on prescribed ones of said clear sub-channels in a manner that reduces sub-channel energy density in said primary user channels containing said prescribed clear sub-channels to a value that mitigates against activating said squelch circuits of receivers operating on said primary user channels; and (e) reducing said sub-channel enemy density contained within said prescribed clear sub-channels by using at least three of the following discriminator methods:

i—constraining dwell times of RF communications transmitted on said prescribed sub-channels, ii—successively hopping between and transmitting on spectrally non-adjacent prescribed sub-channels, iii—successively hopping to and transmitting on prescribed sub-channels in a manner that avoids transmitting on the same sub-channel that was transmitted on during an immediately previous sub-channel hop, iv—transmitting on prescribed sub-channels that do not overlap center portions of said excluded primary user channels, or v—transmitting on prescribed sub-channels spectrally located no closer than adjacent to edges of said excluded primary user channels.

2. The method of conducting RF communications as claimed in claim 1 wherein step (e) further comprises reducing said sub-channel energy density contained within said prescribed clear sub-channels by using at least four of the discriminator methods in step (e).

3. The method of conducting RF communications as claimed in claim 1 wherein step (e) further comprises reducing said sub-channel energy density contained within said prescribed clear sub-channels by using all of the discriminator methods in step (e).

4. The method of conducting RF communications as claimed in claim 1 wherein said prescribed RF communications band comprises the band between 217 to 220 MHz.

5. A radio frequency (RF) communications network comprising:

at least one master site transceiver and one or more remote site transceivers being configured to operate on sub-channels contained within primary user channels on a prescribed RF communications band, said one or more remote site transceivers further comprising circuitry that causes said one or more remote site transceivers to monitor said prescribed RF communications band for the presence of communication activity on said sub-channels, identify those sub-channels which are effectively absent RF communication activity as clear sub-channels available for use in said RF communications network, transmit a list of said identified clear sub-channels to said at least one master site transceiver;

said at least one master site transceiver further comprising circuitry causing said at least one master site transceiver to receive said list of identified clear sub-channels from each of said one or more remote site transceivers, identify sub-channels falling within excluded primary user channels in said prescribed RF communications band, compile a list of prescribed sub-channels that meet the conditions (i) of not falling within said excluded primary user channels and (ii) of having been identified as clear sub-channels, transmit said complied list of prescribed clear sub-channels to said one or more remote site transceivers; and said at least one master site transceiver and said one or more remote site transceivers communicating over said prescribed clear sub-channels while minimizing RF energy on said primary user channels by controllably hopping among and transmitting on selected ones of said prescribed clear sub-channels while reducing energy density on said primary user channels to a value that mitigates against activating squelch circuits of receivers operating on said primary user channels by using at least three of the following discriminator procedures:

(i) constraining dwell times of RF communications transmitted on said prescribed sub-channels, (ii) successively hopping between and transmitting on spectrally non-adjacent prescribed sub-channels, (iii) successively hopping to and transmitting on prescribed sub-channels in a manner that avoids transmitting on the same sub-channel that was transmitted on during an immediately previous sub-channel hop, (iv) transmitting on prescribed sub-channels that do not overlap center portions of said excluded primary user channels, or (v) transmitting on prescribed sub-channels spectrally located no closer than adjacent to edges of said excluded primary user channels.

6. The RF communications network of claim 5 further comprising said at least one master site transceiver and said one or more remote site transceivers communicating using at least four of the discriminator procedures (i)-(v).

7. The RF communications network of claim 5 further comprising said at least one master site transceiver and one or more remote site transceivers communicating using all of the discriminator procedures (i)-(v).

8. The RF communications network of claim 5 further comprising said prescribed RF communications band comprising the band between 217 to 220 MHz.

* * * * *